United States Patent [19]
Rodgers et al.

[11] Patent Number: 5,740,870
[45] Date of Patent: Apr. 21, 1998

[54] AGRICULTURAL IMPLEMENT WITH STACKING WINGS

[75] Inventors: Steven D. Rodgers, North English; Alan F. Barry, Fairfax; Harry C. Deckler, Williamsburg, all of Iowa

[73] Assignee: Kinze Manufacturing, Inc., Williamsburg, Iowa

[21] Appl. No.: 779,309

[22] Filed: Jan. 6, 1997

Related U.S. Application Data

[60] Provisional application No. 60/014,845, Apr. 4, 1996.

[51] Int. Cl.$^6$ ................................................ A01B 51/04
[52] U.S. Cl. ........................... 172/456; 172/458; 172/484
[58] Field of Search ........................ 172/310, 311, 172/452, 456, 457, 458, 460, 662, 484; 111/52, 200

[56] References Cited

U.S. PATENT DOCUMENTS

| | | | |
|---|---|---|---|
| 3,628,613 | 12/1971 | Kaufman | 172/456 X |
| 3,650,333 | 3/1972 | Fueslein | 172/456 X |
| 4,046,203 | 9/1977 | Ward | 172/456 |
| 4,126,189 | 11/1978 | Channel | 172/456 |
| 4,316,511 | 2/1982 | Andersen | 172/456 X |
| 4,660,654 | 4/1987 | Wiebe et al. | 172/456 X |
| 5,577,563 | 11/1996 | Holen | 172/456 |

OTHER PUBLICATIONS

Todd's Fabrication, Inc. brochure "Pick Up and Go Stacking Tool Bars From" (no date).

*Primary Examiner*—Terry Lee Melius
*Assistant Examiner*—Robert Pezzuto
*Attorney, Agent, or Firm*—Emrich & Dithmar

[57] ABSTRACT

An agricultural implement such as a planter has wing sections which, when folded for transport, are stacked side-by-side above a center section. Improvements include structure which reduces bending moments about the pivot connections between a guide link forming part of a four-bar linkage which stacks the wings, and the wing frame. A drive train for the row unit meters is also placed in the transport position without disconnecting the drive shafts.

15 Claims, 12 Drawing Sheets

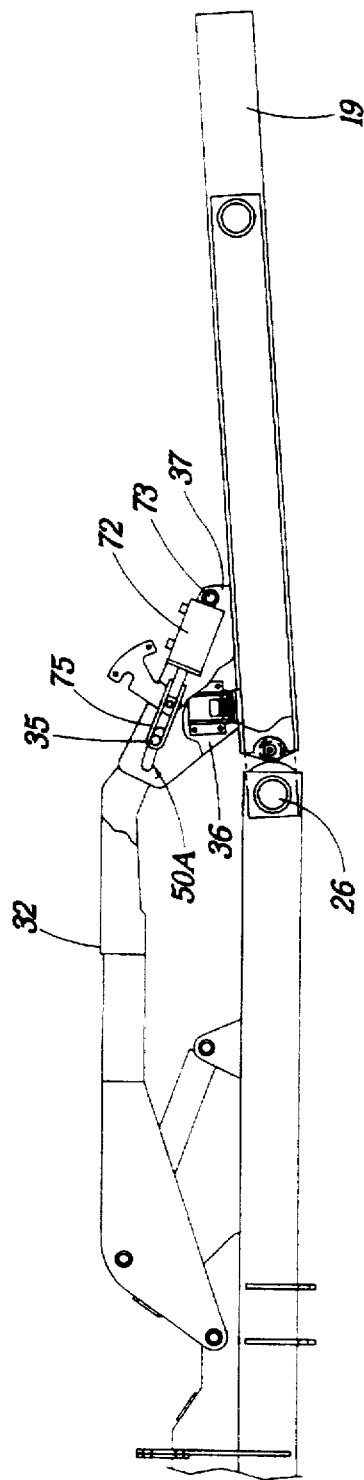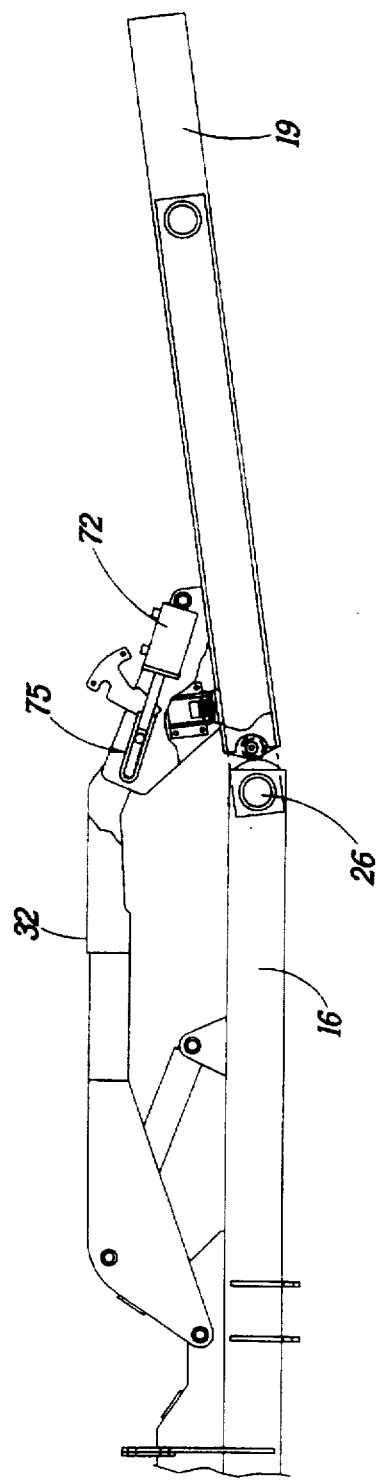
Fig. 13
Fig. 14

5,740,870

AGRICULTURAL IMPLEMENT WITH STACKING WINGS

RELATED APPLICATION

This application claims the benefit of copending U.S. Provisional Application No. 60/014,845, filed Apr. 4, 1996.

FIELD OF THE INVENTION

The present invention relates to agricultural implements; and more particularly to a toolbar support frame having a center section and left and right wing sections. The wing sections are raised above the center section and moved inwardly adjacent one another, stacked above the center section, for transport.

The invention is disclosed in the embodiment of an agricultural row crop planter, but persons skilled in the art will readily appreciate that it may be adapted to other implements, including those with ground-engaging tools such as chisel plows, cultivators and fertilizer applications, or having tools which do not engage the ground, such as sprayers.

As used herein, the term "toolbar" is to be construed broadly, and it refers to the main tubular frame of an agricultural implement, and includes the center section and wing sections, as well. Moreover, in the use position, the wing sections and/or the center section may have support wheels.

The invention consists of certain novel features and a combination of elements hereinafter fully described and illustrated in the accompanying drawings, it being understood that various changes in the details may be made without departing from the spirit, or sacrificing any of the advantages of the present invention.

BRIEF DESCRIPTION OF THE DRAWING

FIGS. 13 and 14 are front elevational views showing the juncture between the lift link and the wing section frame for selectively tilting the wing section frame upwardly for field turn around or the like.

DETAILED DESCRIPTION OF A PREFERRED EMBODIMENT

Figure 1:
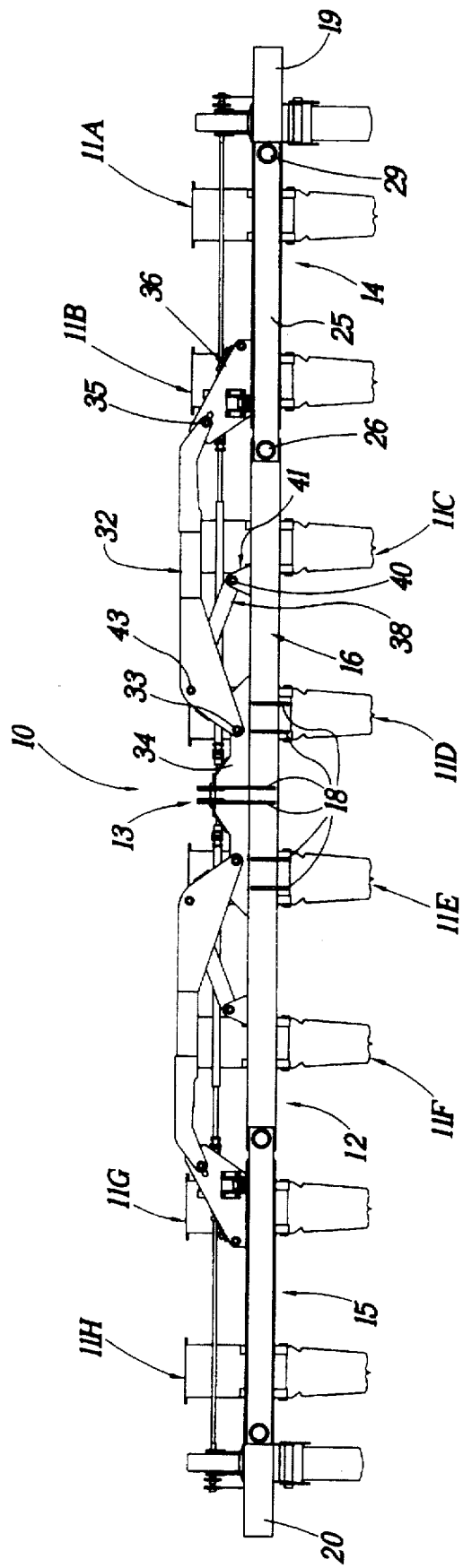
FIG. 1 is a front elevation view of a row crop planter incorporating the present invention.

Referring first to FIG. 1, there is shown an implement generally designated 10 in the form of an agricultural row crop planter. The illustrated embodiment is an eight-row planter having eight individual row units designated respectively 11A–11H. The row units are conventional and form no part of this invention. In fact, devices other than planter row units may be incorporated onto the toolbar of the present invention, such as chisel plows, fertilizer applicators or spraying apparatus, for that matter.

The row units 11A–11H are mounted to the rear of a toolbar or frame generally designated 12 and including a center section generally designated 13, comprising row units 11C–11F, a left wing section 14, comprising row units 11A and 11B, and a right wing section, generally designated 15 and including row units 11G and 11H. Left and right, as is conventional, are determined from the viewpoint of an observer looking in the direction of travel.

The center section 13 includes an elongated tubular frame member 16 which is adapted, by means of a conventional rack generally designated 18 to be mounted to a three-point hitch of an agricultural tractor, as is known in the art.

Figure 15:
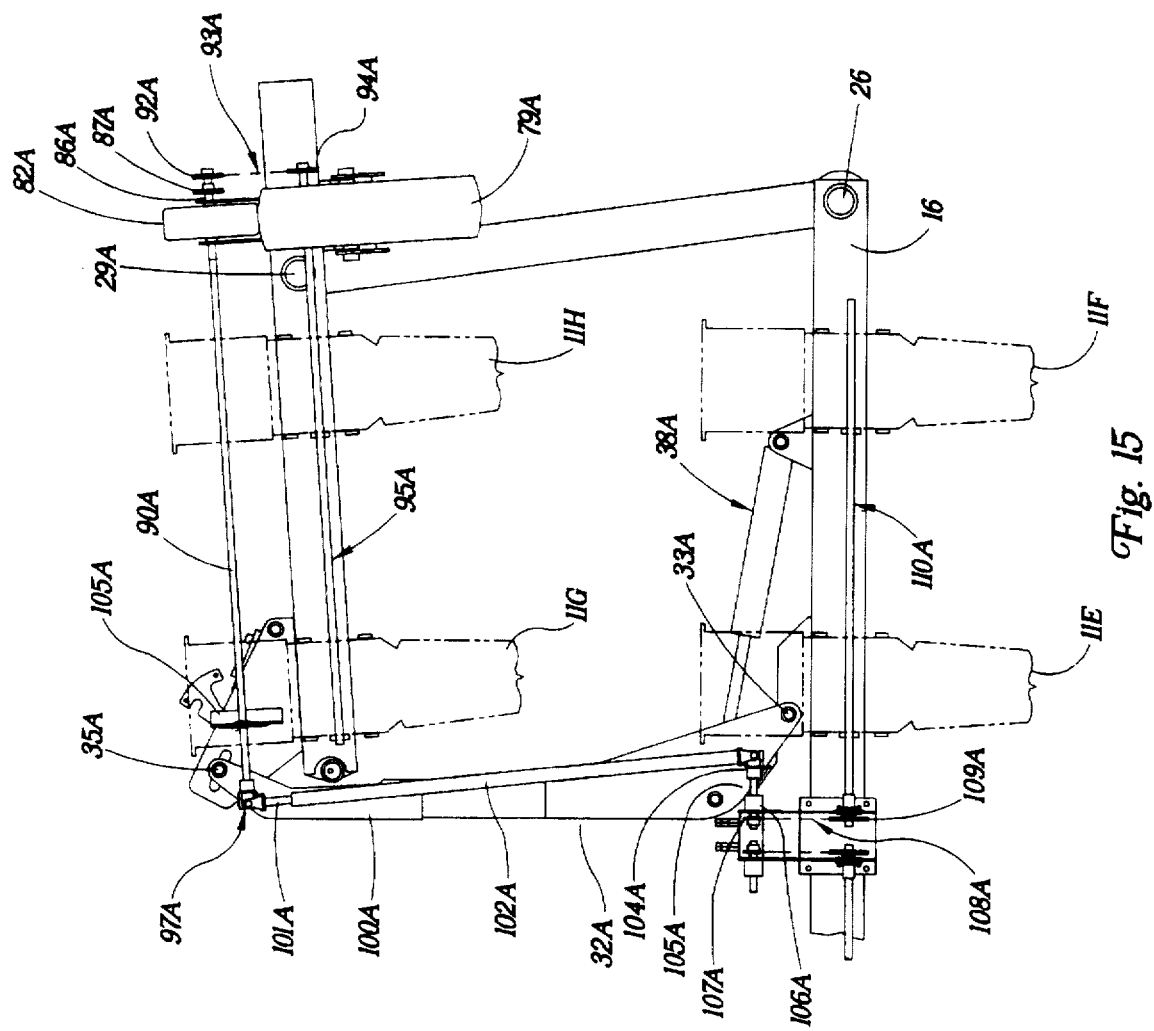
FIG. 15 is a rear elevational view of the right wing section of the planter showing the wing section and the transmission in the transport position.

As seen in FIG. 1, the planter is in the field use or planting position, with all of the row units laterally aligned, but spaced according to the desired row spacing. When the implement is folded or "stacked" for transport, as illustrated in FIG. 15 for the right wing section (since it is a rear view), and as further described below, the entire implement may be raised by the three-point hitch of the tractor for travel over the road or from one field to another.

The left side (that is, from the center to the left end) of the implement is similar to the right side, but in mirror image, so only the left side need be described in further detail for a complete understanding of the invention. It will be realized that the right side is simply a duplication of the left side but in mirror image. In cases where it is convenient to refer to similar components, one on the left and the other on the right, the same reference numerals will be used, but the numeral will be followed by an "A" to designate the right side component (e.g., 82, 82A).

Figure 2:
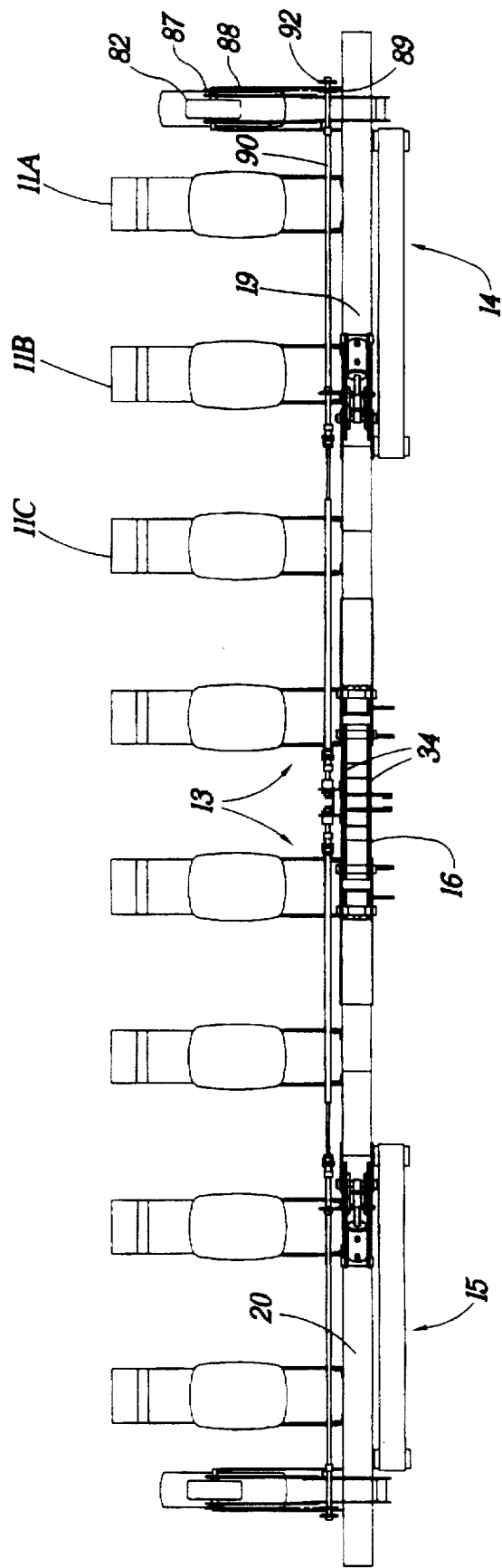
FIG. 2 is a plan view of the planter of FIG. 1.
Figure 3:
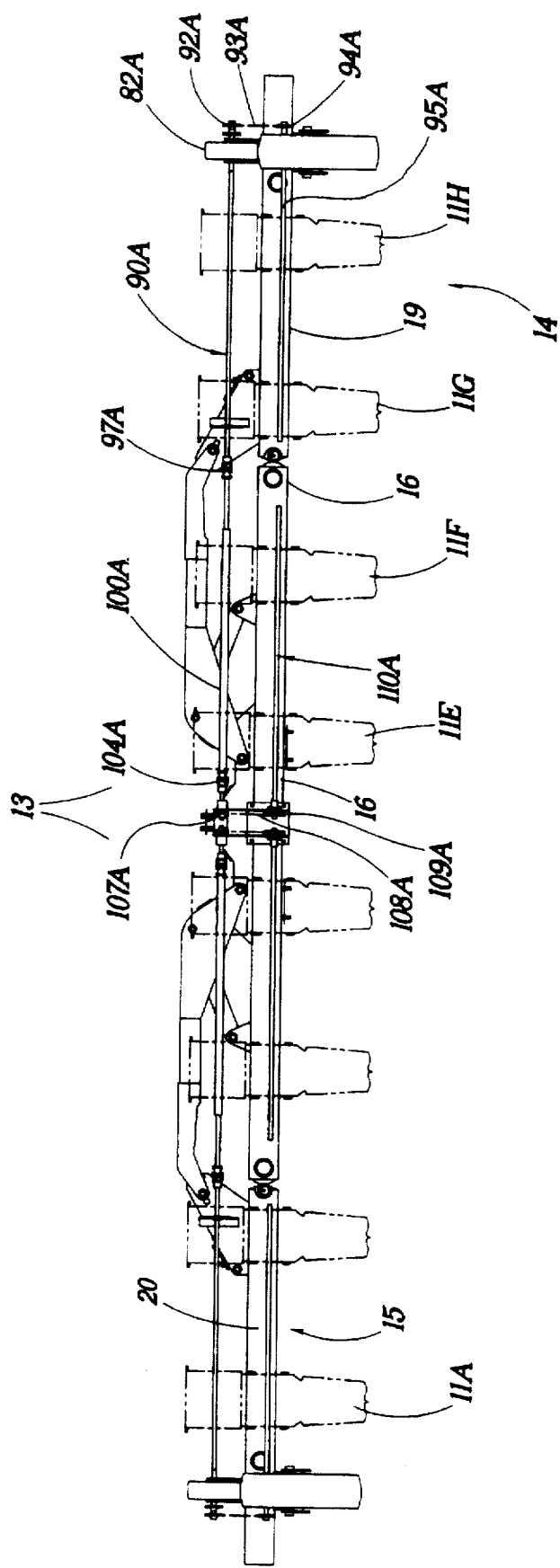
FIG. 3 is a rear elevation view of the planter of FIG. 1.

Referring now to FIGS. 2 and 3, the left wing section 14 includes a main tubular frame member 19 which is aligned with, and pivotally connected to the main frame member 16 of the center section 13, as will be further described below. Similarly, the right wing section 15 includes a tubular frame member 20 which is pivotally connected to, and aligned with, the main frame member 16 of the center section 13. The tubular frames 16, 19 and 20 which form the toolbar collectively are shown to be generally square in cross-section (as shown by an end view of frame 19 in FIG. 4), but they may be rectangular, as well.

Figure 5:
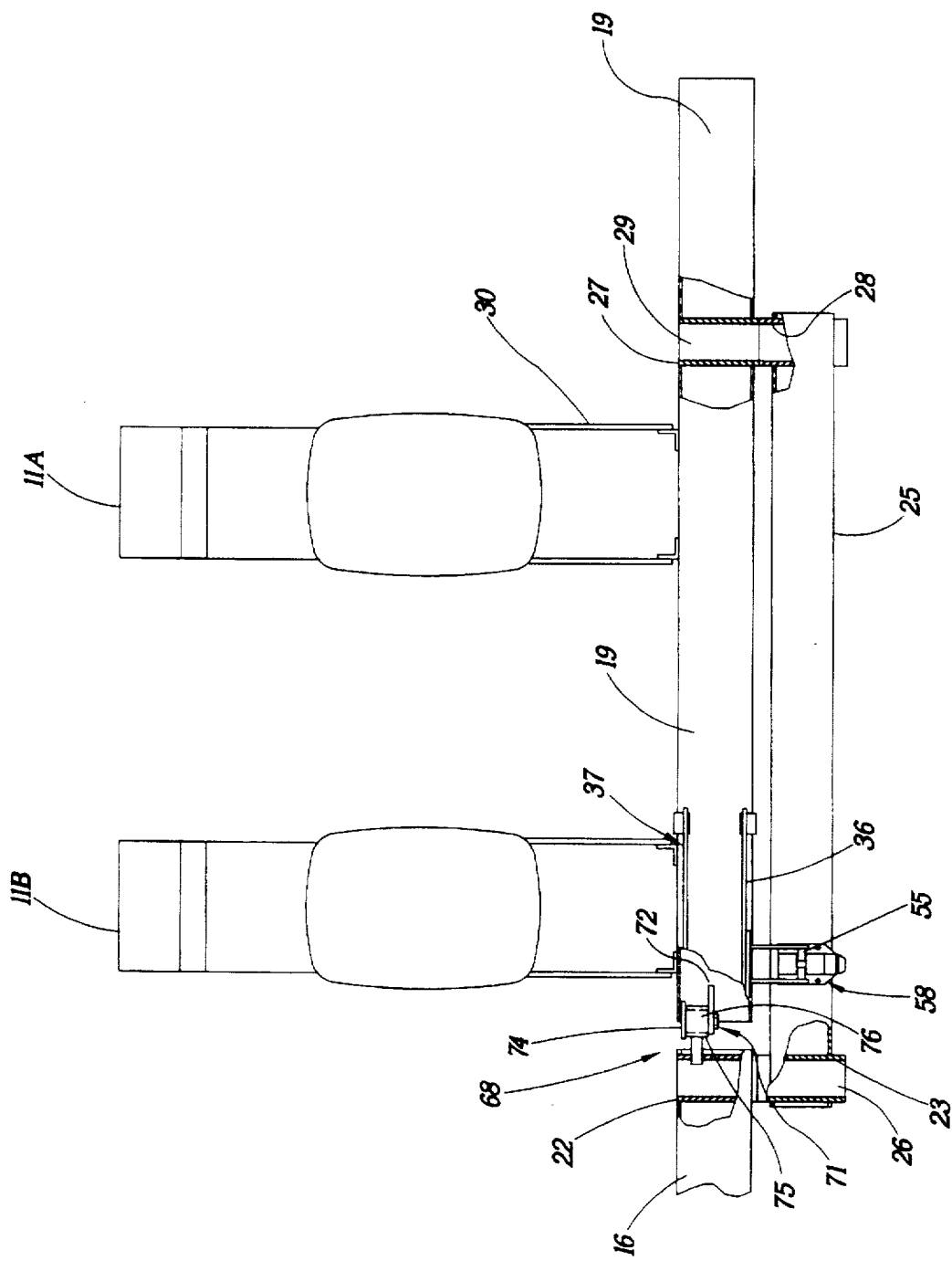
FIG. 5 is a close-up plan view of the left wing section of the planter of FIG. 1, with portions of the frame cut away.

A sleeve having a round cross-section and designated 22 in FIG. 5 is welded in the frame member 16 of the center frame section with the axis of the tube 22 being horizontal and parallel to the direction of travel. A similar tube 23 is welded in the right side of a tubular link, sometimes referred to as a guide link, and generally designated 25. The tubes 22, 23 form a journal for a pivot pin 26 which extends through both of the tubes, permitting the guide link 25 to rotate in a vertical plane relative to the left side of the tubular frame 16 of the center section.

In a similar fashion, sleeves or journals 27 and 28 are welded respectively to the tubular frame member 19 of the left wing section (inboard of the end), and to the left end of the guide link 25. The sleeves 27, 28 also form a journal for a pivot pin or shaft 29 which pivotally connects the guide link 25 to the wing frame member 19.

Figure 4:
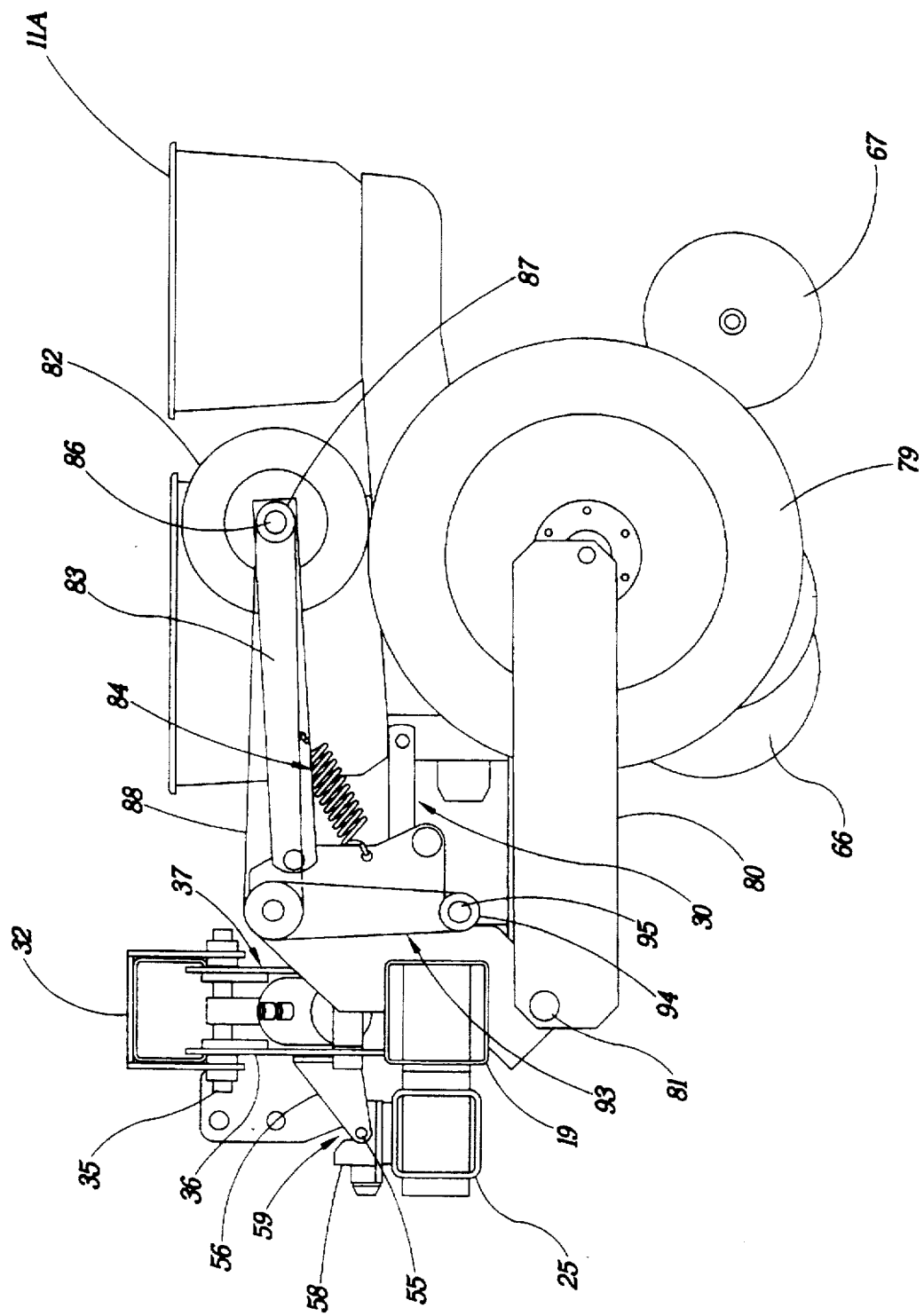
FIG. 4 is a left-side elevational view of the planter of FIG. 1.

As seen in FIG. 4, the row units 11A and 11B are mounted to the frame member 19 of the wing section by means of conventional four-bar linkages, one of which is generally designated 30, for the row unit 11A (see also FIG. 5). This permits the row units individually to adjust to variations in ground contour.

Figure 8:
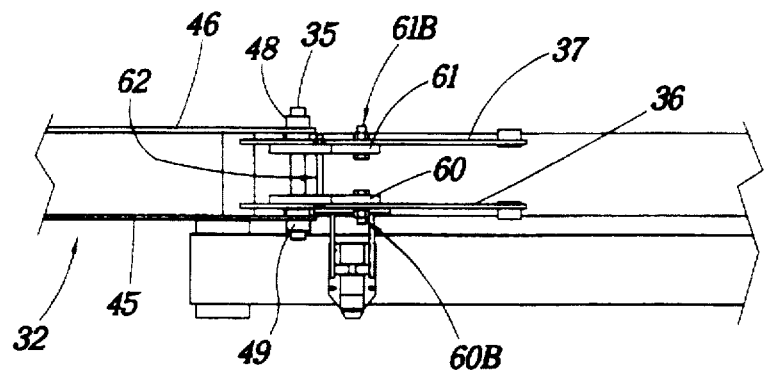
FIG. 8 is a top view of the apparatus shown in FIG. 7.

Returning now to FIG. 1, reference numeral 32 generally designates a lift arm which is pivotally mounted at 33 to a pair of upright plates 34 welded to the main frame of the center section 13. The outboard end of the lift arm is connected by means of a pin 35 to a pair of upright fin plates 36, 37 (FIG. 4). The fin plates 36, 37 are welded to the top of the main tubular frame 19 of the wing section 14 in spaced relation as seen in FIG. 8. Each of the fin plates defines a slot which receives the pin 35 coupling the outboard end of the lift arm to the frame of the wing section, as will be described further below.

From the above description, it will be appreciated that a four-bar linkage is formed by the following members: The lift arm 32, the guide link 25, the main tubular frame member 19 of the wing section (between the pin connection 35 and the axis of pin 29), and the main frame 16 of the center section (between pivot 33 and pin 26). The four-bar linkage just defined is actuated by a hydraulic cylinder 38 having its butt end connected by means of a pivot 40 to a trunnion bracket 41 mounted to the top of the main frame 16 of the center section. The rod end of the hydraulic cylinder 38 is mounted by means of a pin 43 to the lift arm 32, which has a general cross-sectional shape of an inverted U-shaped channel.

Before describing the operation of the four-bar linkage for moving the wing section to the transport position, reference is made to FIGS. 7, 7A, 8 and 10.

Referring first to FIG. 8, the outboard end of the lift arm 32 is in the form of an inverted U-shaped channel having upright flanges 45, 46 (FIG. 8). Sleeves 48, 49 are welded to flanges 46, 45 respectively. Pin 35 passes through sleeves 48, 49 and flanges 45, 46 and slots 50, 50A, thus pivotally connecting lift arm 32 and wing 19. Thus, the pin 35 rides in the slightly arcuate slots 50, 50A of the fin plates 36, 37. The shapes of the plates 36, 37 are the same, fin plate 36 being shown in FIG. 7, and the associated slot in plate 36 is designated 50. Slot 50A is formed in plate 37, in register with the slot 50; and the two slots cooperate to receive the pin 35 and provide a "lost motion" coupling, for reasons to be described below.

Figure 11:
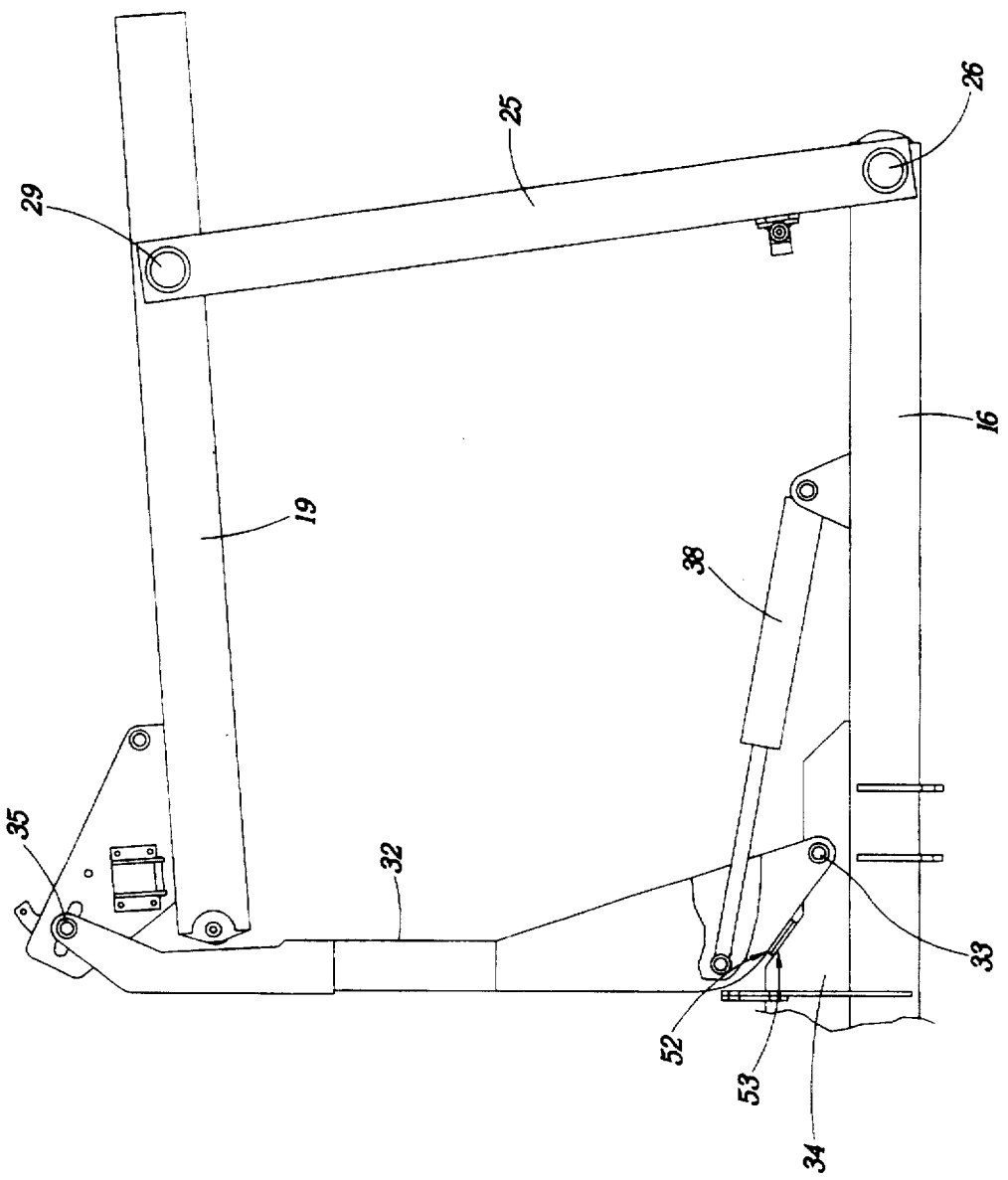
FIG. 11 is a front elevational view of the left wing section and the left portion of the center frame section with the wing section in the stacked or transport position.

When it is desired to raise the wing section from the field use position of FIG. 1 to the transport position of FIG. 11 (or FIG. 15, which is more detailed), the hydraulic lift cylinder 38 (38A in FIG. 15 since it shows the right wing) is actuated to extend. That is, hydraulic fluid under pressure is forced from the hydraulic system of the tractor into the butt end of the cylinder 38, causing the rod to extend. This forces the lift arm 32 to rotate counterclockwise about the pivot 33 (as viewed from the front of the left wing, FIG. 12) This, in turn, causes the guide link 25 to rotate about the pivot 26. The lift arm 32, as it is rotated, forces the main frame 19 of the wing section upwardly and inwardly, the exact trajectory being defined by the configuration of the four-bar linkage, and particularly the location and operation of the guide link 25.

Figure 12:
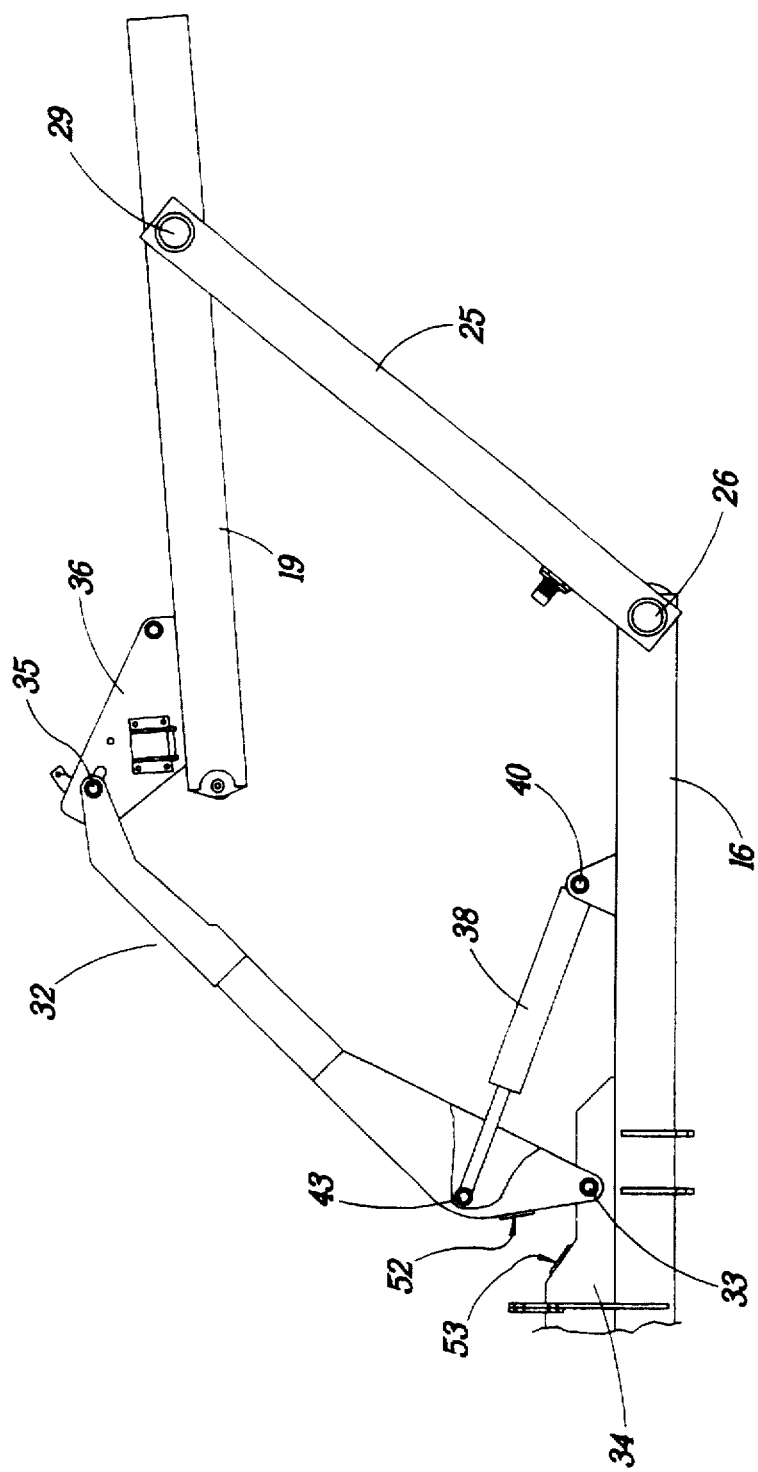
FIG. 12 is a view similar to FIG. 11 with the wing section in an intermediate position between the use position and the transport position.

As the hydraulic cylinder 38 continues to extend, the configuration proceeds from that shown in FIG. 12 to the limit or transport position shown in FIG. 11 wherein the lift arm 32 is substantially vertical, the frame 19 of the wing section is located above the left half of the main frame 16 of the center section, and, of particular note, the guide link 25 is rotated over-center relative to the lower pivot 26. That is to say, the pivot 29 between the outboard end of the guide link 25 and the frame 19 of the wing section in the field use position, is rotated above and inwardly of the pivot 26 in the transport position. Because pivot 29 and pivot 35 are each located inboard of pivot 26 and pivot 33, respectively, the weight of wing 19 tends to force lift arm 32 and link 25 counterclockwise (inward). This is a safety feature because if hydraulic pressure is lost to the cylinder 38 in the transport position, the four-bar linkage is stable because the wing section is in a limit position, as will be described. That is, the tendency of the wing section is to rotate to the left in FIG. 11, rather than to the right, which would permit the wing section to fall. During the raising of the wing section, the pin 35 on the distal end of the lift arm 32 either moves leftward in slot 50 until it engages the left side of the slot 50 in plate 36 and the corresponding slot 50A in plate 37, of pin 35 is captured near the midpoint of the slots 50, 50A by hook 66 (FIGS. 7 and 9), or pin 35 moves to the end of the strap 75 on the rod of cylinder 72 (FIG. 13), then the arm begins to lift the wing section.

A stop plate 52 is welded to the top surface of the lift arm 32, near the pivot 33 in FIG. 12. A corresponding stop plate 53 is welded to the pair of upright plates 34 on the top of the main frame member 16 of the center section. The plates 52, 53 are aligned such that they engage each other when the lift arm 32 is raised to the transport position as seen in FIG. 11, thereby limiting the motion of the four-bar linkage and, thus, defining the transport position as well as the limit of the "over center" position of the wing section.

Figure 6:
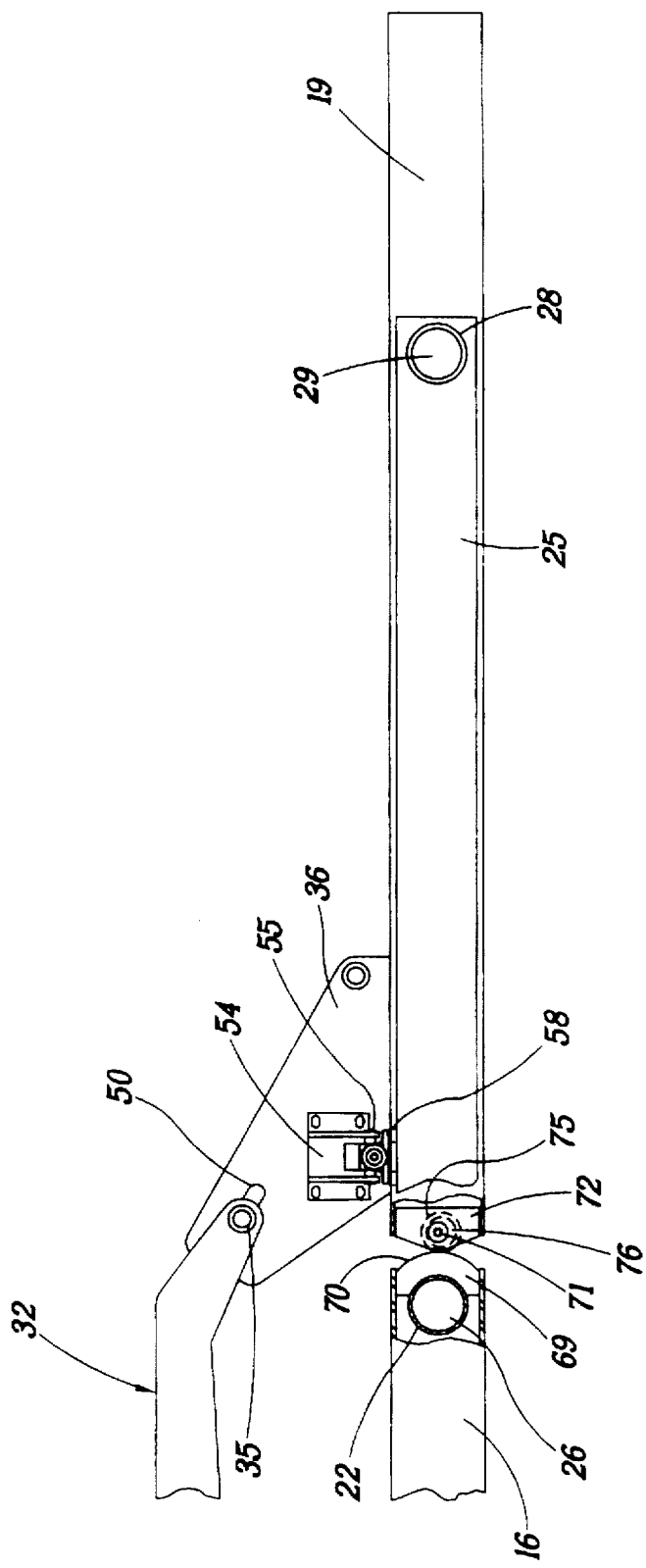
FIG. 6 is a front view of the portion of the planter shown in FIG. 5 with the row units removed.

Turning now to FIGS. 4–6, a rod-shaped catch member 55 is secured to a trunnion bracket 56 bolted to the front surface of the plate 36 mounted on the top of the inboard end of the wing frame member 19.

A latch device generally designated 58 is mounted to the top surface of the guide link 25, and it is aligned to receive the catch rod 55 when the wing frame 19 is lowered to the planting position. As observed in FIGS. 5 and 6 when the wing frame 19 is in the planting position, it is horizontally aligned with the main frame 16 of the center section, and the guide link 25 is also horizontally aligned with the frame member 19 of the wing section. When the catch rod 55 descends into a recess 59 of the latch device 58, it mechanically trips the latch device to secure the catch rod 55 in the latch device, thus locking the wing frame and guide link together, parallel to one another.

The catch rod 55 cannot be released except through hydraulic actuation of a cylinder and piston rod unit forming a part of the latch device 58. The latching device 58 may be a hydraulic latch, Model LH-5000 available through Power-Packer U.S. of Butler, Wis., and further described in U.S. Pat. No. 5,176,417. As mentioned above, the latch is actuated mechanically by inserting a rod into the recess 59 and it is unlatched or disengaged hydraulically, under operator control. Other devices would, however, serve equally well, and the unlatching function could be accomplished entirely mechanically, or electrically, or the engaging and disengaging functions may both be performed hydraulically. When the wing frame member 19 and the guide link 25 are latched together, they rotate in unison about the pin 26.

Figure 7:
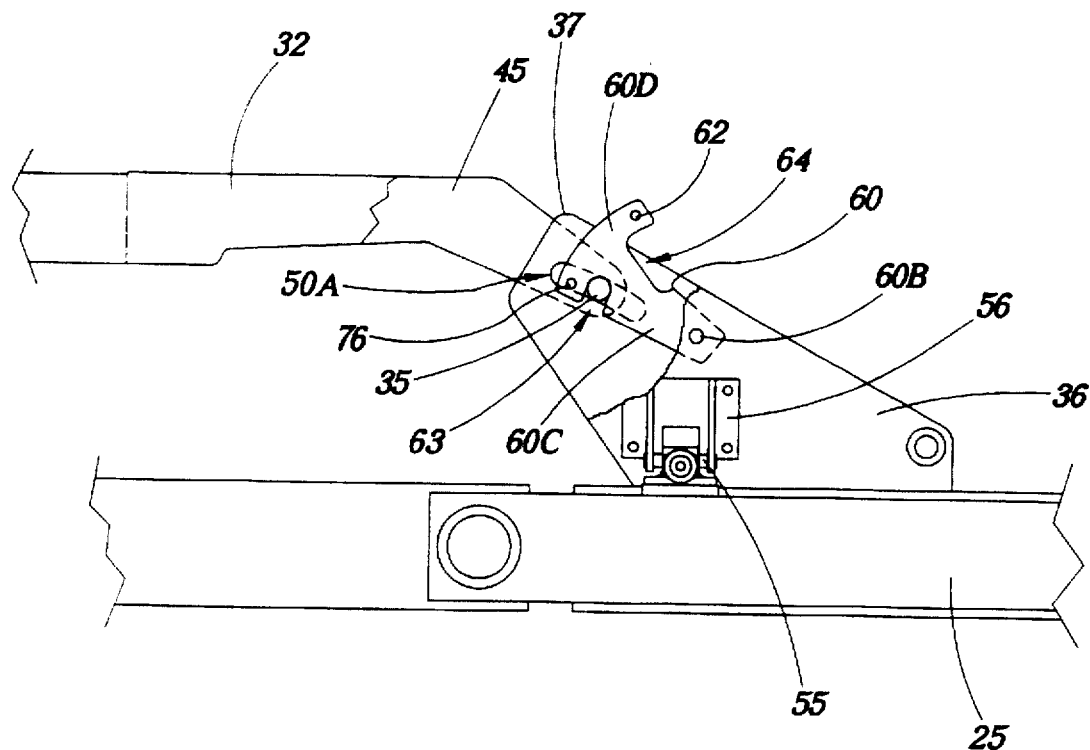
FIG. 7 is a close-up, fragmentary front elevation view showing the apparatus for securing the wing frame to the lift arm with no relative movement between them.

Depending upon operating field conditions, it may also be desirable to permit the wing to flex upwardly and downwardly relative to the main section. It may also be desirable to lock the wing section to the main frame section so that the wing is rigid with the main frame, with the frame members 16, 19 being collinear, and such that the wing cannot rotate or flex relative to the main frame. Alternately, it may be desirable to permit the wing section to flex upwardly but not downwardly. This can be accomplished by the structure seen in FIGS. 7–9. A pair of hooks 60, 61 are bolted at 60B, 61B respectively to the opposing, inner surfaces of plates 36, 37. Each of the hooks 60, 61 is similar, having a base portion as seen at 60C for hook 60 and a curved top 60D (FIG. 7). The hooks are pinned together by a pin or bolt 62 to act in unison. Hook 60 has, on one side of its base 60C, a first slot 63, and, on the other side of base 60C, an elongated slot 64. The hooks can be turned around (compare FIGS. 7 and 9) for purposes described below. The slot 63 is sized to receive pin 35 on lift arm 32 and to limit, the relative motion between the wing and center section (seen in solid line in FIG. 7). This position locks the wing frame 19 collinear to the center section frame.

Figure 7A:
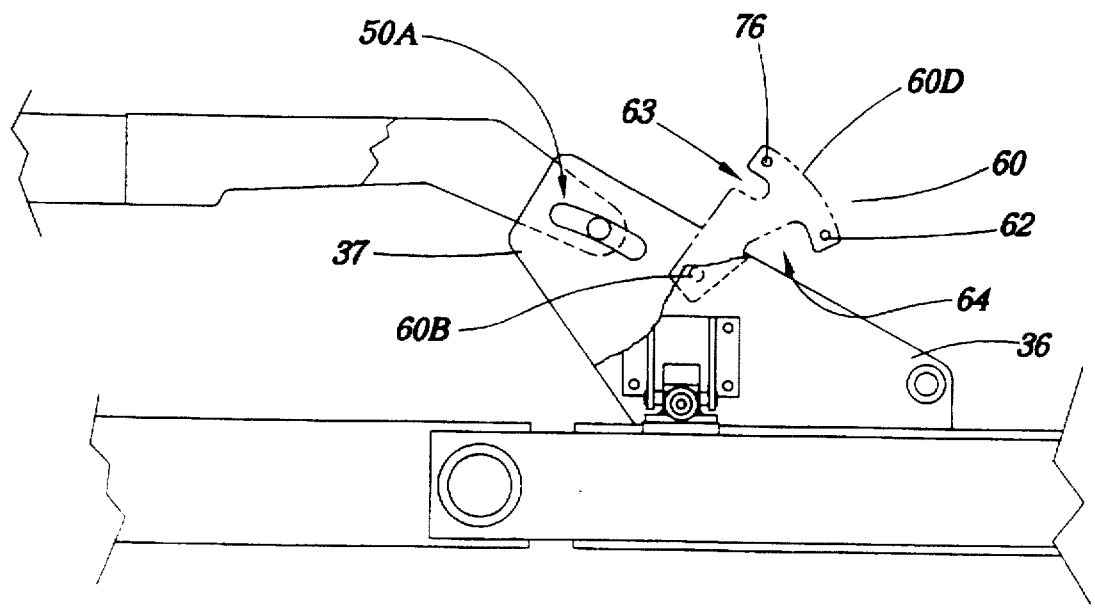
FIG. 7A is a close-up front view similar to FIG. 7 but with the hook unlatched permitting the wing frame to move up and down.
Figure 9:
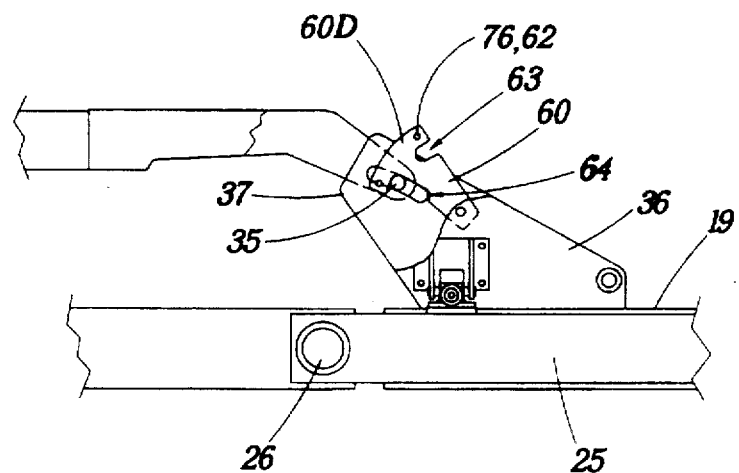
FIGS. 9 and 10 are close-up views similar to FIG. 7 but with the hook positioned to permit the wing to flex upwardly but not downwardly.
Figure 10:
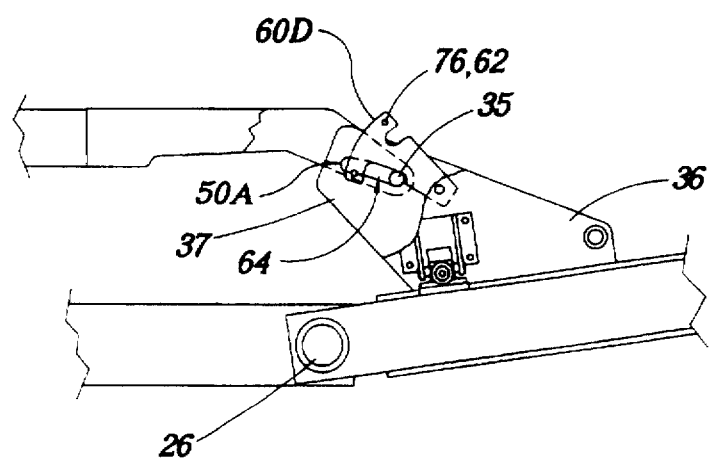

By rotating the hooks clockwise to the position shown in phantom in FIG. 7A, the wing is free to rotate both up and down relative to the center section. The flexing motion is limited only by the length of slots 50, 50A in the fin plates 36, 37. If the hook assembly is turned around (by removing bolts 60B, 61B) so that the elongated slot 64 captures the pin 35, as seen in FIGS. 9 and 10, the wing frame may flex upwardly, but not downwardly relative to the main frame. Compare FIG. 10 with the wing inclined upwardly and pin 35 in the right limit position (as seen in the drawing) of slots 50, 50A, with FIG. 9 wherein the pin is in the left limit position (again, as viewed in the drawings) of elongated slot 64 with the wing horizontal.

In other words, if the wing frame member 19 were to attempt to flex downwardly (that is, pivot clockwise about pin 26) when set up as in FIG. 9, the lock pin 35 would engage the end of elongated slot 64 on the hook 60 and limit the downward flex of the wing section. However, the wing (and guide link 25) may flex upwardly as seen in FIG. 10 until the right side of slots 50, 50A, engage the pin 35 mounted to the lift arm. Each hook 60, 61 has a first set of aligned apertures in the curved cross portion 60D for receiving pin (or bolt) 62 (FIGS. 7, 8) to secure them together in one orientation. A second set of aligned apertures is formed in the other end of the cross portion of both hooks (see aperture 76 for hook 60 in FIG. 7) for receiving the same bolt 62 when the hooks are turned over, as seen in FIGS. 9 and 10 with the elongated slot 64 engaging pin 35.

Turning again to FIGS. 5 and 6, in the illustrated embodiment, there are two row units 11A, 11B on the left wing section frame member 19. It is, of course, possible to have more than two row units on each wing section. In the field use or planting position, the row units generate a substantial draft force. Planter row units of the type used in connection with the illustrated embodiment include a pair of furrow opening discs generally designated 66 in FIG. 4 and a pair of furrow closing wheels generally designated 67. These devices, particularly the furrow openers, create a draft force. The net rearward draft force on the wing section in the planting position creates a bending moment on the main pivot pin 26 which connects the guide link 25 (and the wing section frame member 19) to the frame 16 of the center section.

In order to overcome this bending moment, apparatus generally designated 68 in FIG. 5 is located between the rear of the adjacent edges of the tubular frame members 16, 19 to take up any clearance or attempted relative movement between these members. As seen in FIG. 6, a plate 69 having an outer, radiused surface 70 is welded between the top and bottom surfaces of frame member 16 and adjacent the outer, rear surface of the sleeve 22 for additional strength. A mounting plate 72 is welded partially inside the right-hand portion of the tubular frame member 19 of the wing section, extending between the top and bottom walls of that frame member 19. On the rear of the mounting plate 72 there is located an eccentric roller bearing member generally designated 74. That member includes an outer cylindrical bearing surface 75 and an inner cylindrical shaft 76. Bearing 75 rotates freely about shaft 76 and is captured between a shoulder on shaft 76 (which is larger than the inner diameter of bearing 75) and mounting plate 72. The assembly of 75 and 76 is attached to plate 72 by bolt 71 through plate 72 and threaded into shaft 76 on an axis eccentric to the axes of shaft 76 and bearing 75. Adjustment is achieved by rotating the roller member about its eccentric mount with the bolt loosened, until the cylindrical bearing surface 75 on the roller member engages the curved bearing surface 70 of the plate 69 on the center section frame member 16. When all the clearance is taken up (that is, when the cylindrical bearing member 75 engages the curved bearing surface 70), the bolt 71 is tightened. Thereafter, any draft force created by the row units on the wing section does not create a substantial bending moment on the pivot shaft 26. The bearing surface 70 is curved to permit the wing to flex in the use position, if desired, and to be elevated for transport without interference.

It will be appreciated that the draft forces on the wing frame member 19 created by the row units also induces a bending moment in the pivot shaft or pin 29. This is overcome by the latch 58 and catch pin 55, securing the inboard end of the wing section frame member 19 to the inboard end of the guide link 25, at a location adjacent the pin or shaft 26, and the clearance take-up mechanism 68, just described. The latching apparatus between the guide link 25 and the tubular member 19 could be located elsewhere, depending upon the net effect of the draft force created by the number and spacing of row units.

As has already been explained, it is desirable to provide the possibility that the operator may want to operate the planter under conditions permitting the wing section to flex downwardly (that is, the outboard end of the wing section would be lower than the pivot shaft 26). However, if the wing section were actually sloped downwardly when the operator desired to fold or "stack" the wing section for transport, it could create potential interference between adjacent row units—the innermost one on the wing section and the outermost one on the central section, or between a row unit and an element of the toolbar or main frame member.

When turning the planter around at the end of a field, after a swath of the field has been worked by the implement, the implement is lifted off the ground (to disengage the row units from the planting position or to disengage tillage tools, for example, in the case of a chisel plow). This is done using either conventional lift assist wheels or the hydraulic lift of the tractor three-point hitch, as is well-known in the art. Elevating the outboard end of the wing section slightly during such maneuvers is desirable because it provides even greater clearance between the bottom of the work units and the ground during turning. Thus, a mechanism is included in the illustrated embodiment for elevating the outboard ends of the wing slightly, under control of the operator (or, if desired, automatically when the implement is raised to the field-turn position, which is normally less than the full height to which the implement is raised for transport).

Turning now to FIGS. 13 and 14, an hydraulic cylinder 72 has its butt end pivotally connected by means of a pin 73 to the spaced fin plates 36, 37 (see FIG. 8) welded to the top of the wing section frame 19. A U-shaped strap 75 is welded to the rod of the hydraulic cylinder unit 72, and it extends around the connecting pin 35 mounted to the lift arm 32, and riding in the slots 50, 50A.

When the hydraulic cylinder 72 is retracted, the strap 75 pulls against the pin 35, thereby causing the frame 19 of the wing section to rotate slightly about the pivot shaft 26, and thereby elevate the outboard end slightly, as seen in FIG. 13. In this manner, the wing section may be elevated approximately 4°.

When the hydraulic cylinder 72 is fully extended, as seen in FIG. 14, the wing is free to flex upwardly or downwardly. It will also be appreciated, however, that the use of the cylinder 72, if under operator control, may be used to raise the wing section slightly to facilitate changing position of hooks 60, 61.

With the use of hydraulic cylinder 72, the wing section can thus be brought either to the slightly inclined position shown in FIG. 13, or to a horizontal position before folding or stacking the wing for transport. This obviates possible interference between adjacent row units, one on the wing and one at the outboard end of the center section during folding, as indicated above. Cylinder 72 may be operated by an independent valve under manual control by the operator. The cylinder could also be connected in the tractor hydraulic circuit so that it retracts and raises the wing slightly whenever the three-point hitch of the tractor is raised. This would permit the wing to be raised slightly in a manner shown in FIG. 13, both when preparing the implement for transport and raising the implement to the field-turn position. Alternatively, the cylinder 72 could be connected to the lift-assist wheel hydraulic circuit of the machine. Thus, the cylinder would retract and raise the wing when the lift assist wheels are used (in combination with the tractor three-point hitch) to raise the implement, again for the field-turn position or to prepare the machine for transport.

When the implement is lowered into the field use position (or thereafter), the cylinder 72 is completely extended, as seen in FIG. 14, to allow the wing section to flex within the limits of slots 50, 50A. It will be observed that the hydraulic cylinder 72 is free to rotate about the pin 73, and the strap 75 is free to rotate or move linearly in relation to pin 35, allowing the hydraulic cylinder to accommodate to the various positions necessary to effect the functions just described.

Turning now to FIGS. 4 and 15, when the planter is lowered to the field use position (FIG. 4), a tire 79 engages the ground. Tire 79 is supported by a wheel arm 80 which is pivotally mounted at 81 to a bracket mounted to the wing section toolbar or frame 19. As the planter is pulled forward (to the left in FIG. 4), the ground tire is driven in rotation. A friction-contact tire 82 is held by support arms 83 above the ground-engaging tire 79, and the contact tire 82 contacts the upper portion of the ground tire 79 and is driven by the ground tire. The support arms 83 are pivotally mounted at their forward ends to the same bracket mounted to the frame 19 to which the lower wheels 80 are mounted.

FIG. 15 shows the drive transmission for the right side of the implement, and some of the details are seen more clearly in FIG. 15 since it is a rear view. Where corresponding elements of the drive system and other system components are shown for the right side, as in FIG. 15, they will be differentiated from the corresponding components on the left side by an "A" following the corresponding reference numeral. Thus, the right side ground tire is 79A and the friction-contact tire on the right side is designated 82A in FIG. 15.

Returning to FIG. 4 for reference, a coil spring 84 in tension holds the wheels support arms 83 in a downward position, thereby urging the contact tire 82 into engagement with the ground wheel 79 to ensure a continuous, uninterrupted drive to the seed meters in the row units, as will be described further below. A short shaft 86A (FIG. 15) is connected to and driven by contact wheel 82A. A sprocket 87A is mounted to the shaft 86A and driven thereby.

Referring to FIG. 2, a chain 88 is entrained around the sprocket 87 and drives a sprocket 89 located forwardly of the contact wheel 82. The sprocket 89 drives an upper shaft 90 which extends inboard to couple power to row units mounted on the center frame section, as will be described.

A sprocket 92, located outboard of the sprocket 89, is also driven by the shaft 90. As best seen in FIG. 15, the sprocket 92A is coupled to a vertically-oriented chain 93A which drives a sprocket 94A mounted to a horizontal shaft 95A which extends inboard, toward the center section, and couples power to the seed meters for the row units on the wing section. For example, in FIG. 15, the shaft 95A drives the seed meters for row units 11G and 11H.

Returning to the upper shaft 90A in FIG. 15, it does not directly drive seed meters, but rather couples power to a universal joint (or simply U-joint) 97A. The other coupling of the U-joint 97A is connected to a telescoping shaft generally designated 100A and including an inner telescoping member 101A (coupled to the universal joint 97A), and an outer telescoping member 102A, the distal end of which is connected to a second universal joint 104A. The shaft 90A is supported by bracket and bearing assemblies such as the one designated 105A in FIG. 15.

The other end of the universal coupling 104A is connected to a shaft 105A which is journaled in a bearing 106A and drives a sprocket 107A. The sprocket 107A is coupled to a chain 108A which is also entrained around a sprocket 109A. The sprocket 109A is coupled to a shaft 110A. The shaft 110A drives the seed meters associated with the row units 11E and 11F which are mounted on the tubular frame member 16 of the center frame section.

The telescoping shaft 100A allows for the drive shaft train, comprising shaft 90A and telescoping shaft 100A to remain connected whether the planter is in the use position of the transport position (FIG. 15) and accounts for varying positions of the wing as it rotates about pin 26 while planting over uneven terrain (when the wings are allowed to float down and/or up).

Referring now to FIG. 3, in the field planting position, power is continuously coupled from the contact wheel 82A through sprocket 92A, chain 93A, sprocket 94A and shaft 95A to drive the seed meters for row units 11G and 11H. Power is also continuously coupled from the friction wheel 82A through the shaft 90A, universal coupler 97A, telescoping shaft 100A, universal coupler 104A, sprocket 107A, chain 108A, sprocket 109A to lower horizontal shaft 110A which drives the meters for row units 11E and 11F (FIG. 3). It will be observed that FIG. 3 is a rear view so that the right side of the machine is on the right side, whereas in FIG. 2 the left side of the machine is on the right side of the page.

Although the transmission system just described is powered by contact tires 82, 82A, power could alternatively be generated by an hydraulic or electric motor, or by other power source. Further, in the illustrated embodiment, shaft 100A is shown as telescopic. If it were desired to change the dimensions or arrangement of the drive components, shaft 90A or both shafts 90A and 100A could be telescopic.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In an agricultural implement including a center section and first and second wing sections, and row units carried by said center section and said first and second wing sections, said implement adapted to convert between a use position in which said wing sections are laterally aligned with said center section, and a transport position in which said wing sections are stacked above said center section, the improvement wherein each wing section comprises:

a wing frame;

a guide link having inner and outer ends;

first pivot means pivotally connecting said guide link at a location adjacent said outer end thereof to said wing frame;

second pivot means adjacent the inner end of said guide link for connecting said guide link to said center section for rotation about an axis extending in the direction of travel of said implement; and a bearing member mounted to one of said wing section frame and said center section and arranged to contact the adjacent end of the other of said wing section frame and said center section when said implement is arranged in the use position, thereby to resist a bending moment on said second pivot means generated by a draft force on said wing section.

2. The apparatus of claim 1 further comprising, a frame for said center section and, for each wing section, a lift arm having an inboard end and an outboard end; third pivot means for pivotally mounting the inboard end of said lift arm to said center section frame; fourth pivot means for pivotally mounting the outboard end of said lift arm to said wing section frame; and power means for selectively raising and lowering said lift arm about the pivotal connection of the inboard end thereof to said center section frame, whereby a four-bar linkage is formed, for each wing section, by a portion of the associated wing frame, a portion of said center section frame, and the associated lift arm and guide link, said four-bar linkage constructed and arranged such that in the raised position, said wing section frame is located generally above the associated side of said center section frame and is inclined outwardly and upwardly from the inboard, raised end thereof, and further characterized in that said lift arm and said guide link are positioned over-center relative to their associated pivotal connections to said center section frame, whereby the weight of said wing section urges said wing section toward the center of said implement in the raised position to stabilize said implement for transport.

3. The apparatus of claim 2 further including a first stop member on said center section frame, and a second stop member on said lift arm, said first and second stop members arranged to engage each other in the raised position of said lift arm to limit the rotation of said lift arm in the transport position.

4. The apparatus of claim 1 wherein the pivotal connection between said guide link and said center section frame includes a cylindrical pin having one end journaled to said center section frame and a second end journaled to the inner end of the associated guide link; said implement further comprising a bearing plate mounted to the outboard end of said center section frame and radiused in a vertical direction to engage continuously said bearing member of the adjacent wing section frame as said wing section flexes vertically, whereby said resistance to a bending moment about said pivot pin exists for a range of use positions of said wing section as said wing section conforms to different ground contours.

5. The apparatus of claim 4 wherein said bearing member comprises an eccentrically-mounted cylindrical sleeve; and further comprising means for releasably securing said sleeve to the inboard end of said wing section frame adjacent thereto, and in contact with the associated radiused plate of said center section frame, whereby said releasably securing means may be loosened and said cylindrical sleeve adjusted about the eccentric mount thereof to remove clearance between the bearing member on the inboard end of a wing section frame and the radiused plate on the associated outboard end of said center section frame.

6. The apparatus of claim 1 further comprising latch means including a latch member mounted to one of said guide link and associated wing section frame, and a catch member mounted to the other of said guide link and associated wing section frame, said latch member and said catch member being constructed and arranged to engage and latch to secure said wing section frame to the associated guide link when said wing section frame is lowered to the use position, said latch means, when engaged, permitting said wing section frame to rotate about a horizontal axis defined by said pivotal connection between said guide link and said center section frame, said latch means further acting to reduce bending moment about the pivotal connection between the outboard end of its associated guide link and said wing section frame.

7. The apparatus of claim 6 wherein said center section frame and said wing section frames comprise elongated tubular members of substantially the same cross section and wherein said guide links comprise elongated tubular members of substantially the same cross section as said center frame section and said wing frame sections.

8. The apparatus of claim 7 wherein said latch means is located adjacent the inboard end of an associated wing section frame.

9. In an agricultural implement including a center section having a frame and first and second wing sections, each wing section having a frame, and row units carried by said center section frame and said first and second wing section frames, said implement adapted to convert between a use position in which said wing sections are laterally aligned with said center section, and a transport position in which said wing sections are stacked above said center section, the improvement wherein each wing section comprises:

a guide link extending generally horizontally and parallel to said center section frame in the use position, and having inner and outer ends;

said guide link being pivotally mounted adjacent said inner end thereof to said center section frame and pivotally mounted at said outer end thereof to the associated wing section frame;

first latch means for latching said guide link to said wing section frame in the use position, said first latch means being located intermediate the inboard and outboard ends of said guide link, whereby when said first latch means is secured, said wing section frame is secured to said guide link and rotates with said guide link about the pivotal connection between said guide link and said center section frame;

a lift arm having an inboard end pivotally connected to said center section frame and an outboard end pivotally connected to said wing section frame and movable between said use position and said transport position when said latch means is unlocked;

and a second latch means carded by said wing section for securing the outboard end of said lift ann to said wing section whereby when said second latch means is in a secured position, said wing section frame remains substantially parallel to and collinear with said center frame section, said second latch means also including means for securing the outboard end of said lift arm, in a second latched position, to said wing section frame and permitting said wing section frame to be raised relative to said center section frame, but preventing said wing section frame from being lowered to a position beneath an extension of said center section frame, said second latch means also being capable of being de-actuated whereby said wing section may be raised and lowered relative to said center section frame to follow the contour of the ground, and said outboard wing section may be operated in three modes relative to said center section.

10. The apparatus of claim 9 further comprising a power actuator carried by said wing section and having an elongated slot; a pin adjacent the outboard end of said lift arm received in the slot of said power actuator on said wing section, said power actuator and said pin on said lift arm being constructed and arranged such that said power actuator may be actuated to lift said wing section to a raised position, and said power actuator may be de-actuated to permit said wing section to rotate freely relative to said center section.

11. In an agricultural implement including a center section having a frame including a first elongated tubular frame member having an axis, and first and second wing sections, each wing section having a frame including a second elongated tubular frame member having an axis, and row units carried by said center section frame and said first and second wing section frames, said implement adapted to convert between a use position in which said axes of said first tubular frame and said second tubular frame members are generally horizontally aligned, and a transport position in which said wing sections are stacked above said center section, the improvement comprising:

a guide link for each wing section extending generally horizontally and parallel to said first and second tubular frame members in the use position, and each having inner and outer ends;

said guide link being pivotally mounted adjacent said inner end thereof to a location adjacent the outboard end of said center section frame and pivotally mounted at said outer end thereof to the associated wing section frame at a portion of said wing section frame outboard of the center thereof;

a lift arm for each wing section, having an inboard end pivotally connected to said center section frame and an outboard end pivotally connected to said wing section frame and movable between said use position and said transport position;

and a hydraulic cylinder for each wing section having one end pivotally mounted to said center section frame and a second end pivotally mounted to the associated lift arm whereby when said hydraulic cylinder is extended, said lift arm pivots about said one end pivotally mounted to said center section frame, and said lift arm and guide link cooperate to lift the associated wing section in generally horizontal disposition to said transport position, and characterized in that the pivot connections of the outboard ends of said lift arm and said guide link to the associated wing section frame are spaced apart horizontally to stabilize said wing section when moving said wing between said transport and use positions.

12. In an agricultural implement including a center section having a tubular frame, first and second wing sections, each wing section having a tubular frame, and a plurality of row units carried by said center section frame and said first and second wing section frames, said implement adapted to convert between a use position in which said first and second wing section frames are laterally aligned with said center section frame, and a transport position in which said wing sections are stacked above said center section, the improvement wherein each wing section comprises:

an elongated guide link extending substantially parallel to and spaced in front of said center section frame and the associated wing section frame in the use position, and having inner and outer ends;

first pivot means for pivotally mounting said inner end of said guide link to said outboard end of said center section frame;

second pivot means for pivotally mounting said outer end of said guide link to the associated wing section frame;

a lift arm having an inboard end pivotally connected to said center section frame and an outboard end pivotally connected to said associated wing section frame and movable between said use position and said transport position; and bearing means interposed between the outboard end of said center section frame and the inboard end of the associated adjacent wing section frame and constructed and arranged to limit the rearward deflection of the associated wing section frame under use conditions;

said improvement characterized in that each guide link is substantially straight and is located in front of, and in horizontal alignment with, said center section frame and said wing section frame associated therewith in the use position on level ground.

13. The apparatus of claim 12 in which the bearing means for each wing section comprises a bearing member mounted to one of the inboard end of said wing section frame and the adjacent outboard end of said center section frame, and a bearing plate mounted the other of the inboard end of said wing section frame and the adjacent outboard end of said center section frame.

14. The apparatus of claim 13 wherein said bearing member has a generally cylindrical surface and said bearing plate has a curved surface to permit said wing section to flex vertically while said bearing member and bearing plate are engaged.

15. The apparatus of claim 12 further comprising for each wing section, means for selectively securing the associated guide link to said wing section frame such that wing section frame is free to flex vertically about said first pivot means while resisting bending moments at said second pivot means.

* * * * *

UNITED STATES PATENT AND TRADEMARK OFFICE
CERTIFICATE OF CORRECTION

PATENT NO. : 5,740,870
DATED      : April 21, 1998
INVENTOR(S) : STEVEN D. RODGERS, ET AL It is certified that error appears in the above-indentified patent and that said Letters Patent is hereby corrected as shown below:

Col. 4, line 25, after "37," "of" should be --or--; and in line 26, "66" should be --60--;

Col. 11, claim 9, line 11, "carded" should be --carried--; and in line 12 "ann" should be --and--.

Signed and Sealed this

Sixteenth Day of June, 1998

Attest:

BRUCE LEHMAN

Attesting Officer      Commissioner of Patents and Trademarks